United States Patent [19]

Carome

[11] Patent Number: 5,276,322
[45] Date of Patent: Jan. 4, 1994

[54] FIBER OPTIC ACCELEROMETER

[75] Inventor: Edward F. Carome, Cleveland, Ohio

[73] Assignee: Edjewise Sensor Products, Inc., Cleveland, Ohio

[21] Appl. No.: 599,402

[22] Filed: Oct. 17, 1990

[51] Int. Cl.$^5$ ............................................. H01J 5/16
[52] U.S. Cl. ........................ 250/227.21; 250/231.1; 73/517 R
[58] Field of Search .................. 250/227.21, 227.11, 250/231.1; 324/96; 73/516

[56] References Cited

U.S. PATENT DOCUMENTS

| | | | |
|---|---|---|---|
| 3,146,057 | 8/1964 | Rona | 346/108 |
| 3,449,587 | 6/1969 | Barnes | 250/227 |
| 4,239,963 | 12/1980 | August et al. | 250/231 |
| 4,249,076 | 2/1981 | Bergstrom et al. | 250/227 |
| 4,275,296 | 6/1981 | Adolfsson | 250/227 |
| 4,345,482 | 8/1982 | Adolfsson et al. | 73/862.59 |
| 4,353,259 | 10/1982 | Schneider, Jr. | 73/653 |
| 4,376,390 | 3/1983 | Rines | 73/517 |
| 4,403,144 | 9/1983 | Strahan | 250/231 |
| 4,498,004 | 2/1985 | Adolfsson et al. | 250/227 |
| 4,595,830 | 6/1986 | McMahon | 250/227.21 |
| 4,800,267 | 1/1989 | Freal et al. | 73/517 R |
| 4,829,821 | 5/1989 | Carome | 73/516 |
| 4,891,512 | 1/1990 | Naden | 250/231.1 |
| 4,900,918 | 2/1990 | Killian | 250/231.1 |

OTHER PUBLICATIONS

An Introduction to Fiberoptic Sensors by C. Davis, Fiberoptic Technology, Feb. 1982, pp. 112–115.
Sensing with Optical Fibers: An Emerging Technology by A. Tebo, Electro-Optical System Design, Feb. 1982, pp. 39–45.

Primary Examiner—David C. Nelms
Attorney, Agent, or Firm—Fay, Sharpe, Beall, Fagan, Minnich & McKee

[57] ABSTRACT

Light from a light source (10) is transmitted along an optical fiber (12) through a sensor (14) to opto-electronics (16). The sensor includes a cantilevered beam (20) that flexes in response to acceleration causing its free end (26) to move. Light from the optical fiber (12) is transmitted along an optical fiber to a terminal end (30) thereof and across a gap (34). Light transmitted across the gap is returned to the optical fiber by a mirror (FIG. 2) or received by a free end (36) of a second optical fiber (FIG. 1) and conveyed to the opto-electronics. The beam member is configured with an appropriate stiffness that under acceleration, the beam flexes moving its free end sufficiently to change measurably through transmission of light across the gap to the opto-electronics.

15 Claims, 2 Drawing Sheets

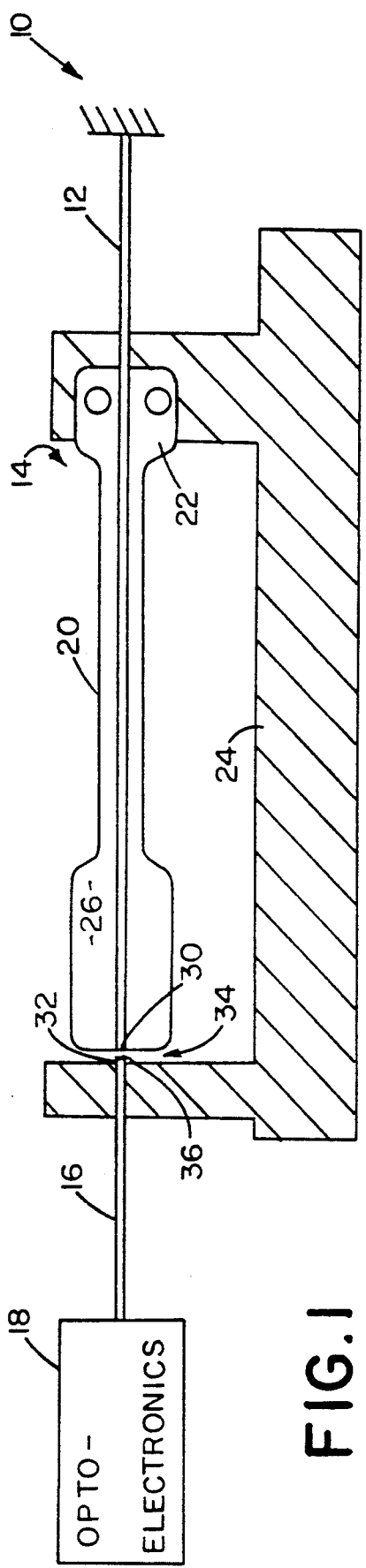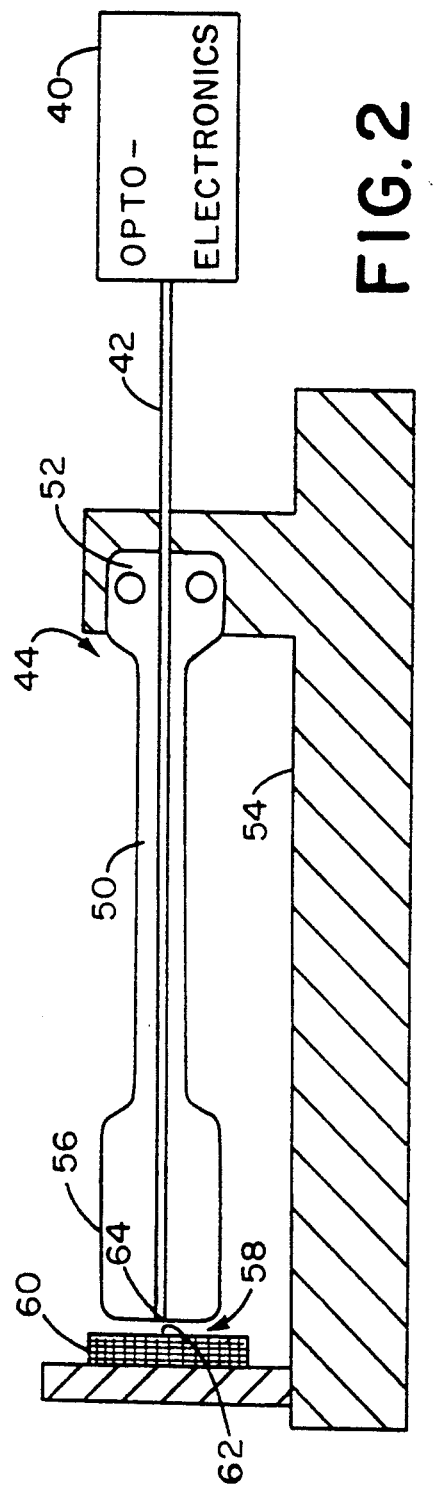

FIBER OPTIC ACCELEROMETER

BACKGROUND OF THE INVENTION

The present invention relates to sensors for sensing acceleration and vibration.

Heretofore, the acceleration and vibration sensors have been primarily of electromechanical nature. One prior art acceleration sensor uses a mercury switch which is configured such that the selected acceleration moves the mercury to a position in which it closes an electrical connection between leads. Prior art vibration sensors utilize electrical conductors moving with respect to magnetic fields or piezoelectric elements that produce electric signals proportional to acceleration.

Fiber optic accelerometers of numerous designs are available. The fiber optic systems have numerous advantages over mechanical and electromechanical accelerometers, such as their increased sensitivity and immunity to electrical interference. However, the fiber optic accelerometers tend to be relatively expensive. Moreover, the fiber optic accelerometers are not as amenable to automated manufacture as the prior art electromechanical and electrical acceleration sensors.

SUMMARY OF THE INVENTION

In accordance with the present invention, the fiber optic accelerometer includes a beam member that is mounted at a first or fixed end and extends to a second or free end. An optical fiber extends along or through the beam to the free end and terminates at the free end opposite a target that is fixedly mounted across a gap therefrom. Under acceleration, the beam flexes and the amount of light transferred between the optic fiber and the target changes in accordance with such acceleration.

In accordance with a more limited aspect of the present invention, the target is a terminal end of a second length of optical fiber. Light flows from a light source through one of the optical fibers across the gap and through the other to an opto-electronic transducer which produces an output signal in accordance with the intensity of received light. As the terminal ends of the two optical fibers move progressively out of alignment, the sensed light intensity terminates or diminishes indicating increased acceleration.

In accordance with another aspect of the present invention, the target is a mirror. An intensity detector is connected with the optical fiber to measure the changes in the relative intensity of the reflected light.

One advantage of the present invention relies in its simplicity of manufacture.

Another advantage of the present invention is that is amenable to automated, mass manufacturing techniques.

Another advantage of the present invention is that it accurately measures acceleration.

Still other advantages of the present invention will become apparent upon reading and understanding the following detailed description.

BRIEF DESCRIPTION OF THE DRAWINGS

The invention may take form in various parts and arrangements of parts or in various steps and arrangements of steps. The drawings are only for purposes of illustrating a preferred embodiment and are not to be construed as limiting the invention.

FIG. 1 is a diagrammatic illustration in partial section of one form of the optical fiber accelerometer;

FIG. 2 is an alternate embodiment of the sensor system of FIG. 1;

DETAILED DESCRIPTION OF THE PREFERRED EMBODIMENTS

Figure 3:
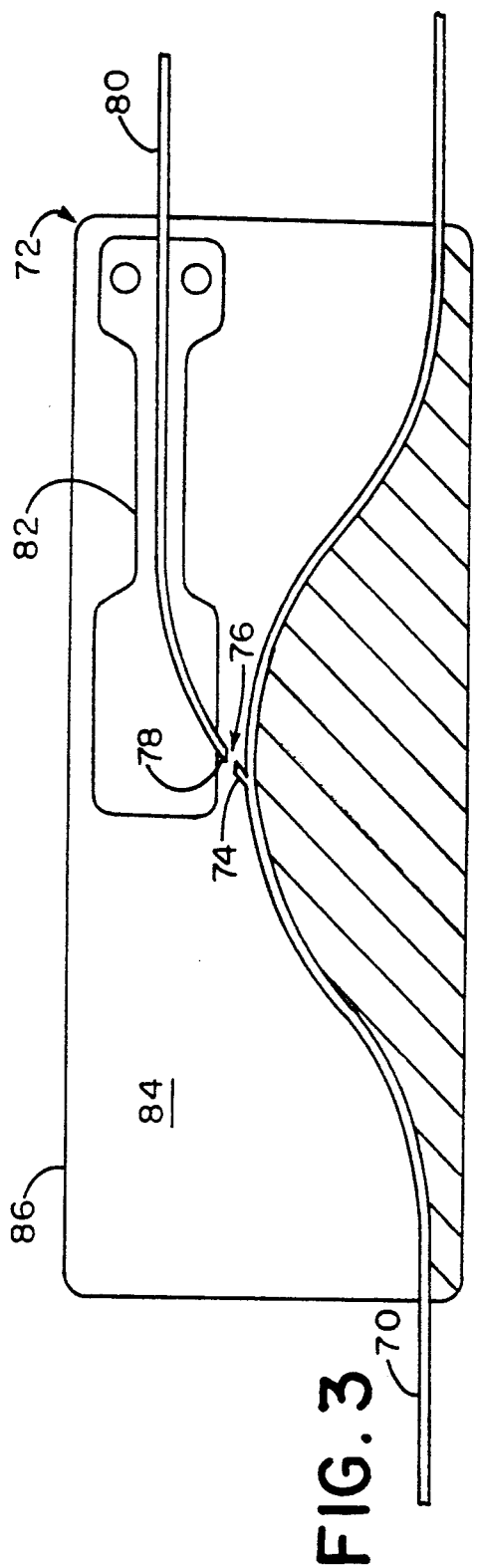
FIG. 3 is an alternate embodiment of the sensor of FIG. 1.

With reference to FIG. 1, a source of illumination 10 sends light along a first optical fiber 12 to an acceleration sensor A second optical fiber 16 carries light from the sensor to an opto-electrical sensor means 18 which senses changes in the intensity from the light source 10 that has passed through the sensor 14. Under acceleration, the amount of light passing through the sensor changes.

The sensor 14 includes a cantilever beam member 20 which is fixedly mounted adjacent a first end 22 to a base or support structure 24. The beam member 20 is enlarged or weighted adjacent a free end 26 to adjust its sensitivity to acceleration. The first optical fiber 12 extends along the beam member and terminates at a terminal end 30 adjacent the free end 26 of the beam member. A light receiving target means 32 is positioned directly across a gap 34 from the terminal end 30 of the first optical fiber to receive light therefrom. The second optical fiber 16 is mounted to the base or supporting structure 24 with a terminal end 36 positioned to function as the target means. Under acceleration, the beam member 20 flexes moving the terminal ends of the first and second optical fibers out of alignment. The beam member is constructed of appropriate materials and with appropriate cross section and stiffness such that a selected range of acceleration is required to cause the misalignment between the first and second optical fiber terminal ends. Optionally, the beam member may be encased in a viscous, damping elastomer to limit response rate, vibration, and the like.

In the embodiment of FIG. 2, the opto-electrical means 40 includes a light source such as a light emitting diode, from which is light transmitted over an optical fiber 42 to a sensor 44 which reflect light back in accordance with sensed acceleration.

The sensor 44 includes a beam member 50 mounted at one end 52 to a base 54. A free end 56 is mounted across a gap 58 from a target means specifically a segmented mirror 60 mounted to the base 54 in a target area 62. The optical fiber 42 extends along the beam member to a terminal end 64 adjacent the beam free end 56. The segmented mirror in the target area reflects light emitted from the optical fiber free end back into the free end when the beam is pointing directly at the target area. Flexing of the beam 50 disrupts the reflection of the light back to the optical fiber terminal end. Optionally, a second optical fiber may be provided to receive the reflected light.

With reference to FIG. 3, a bus optical fiber 70 runs through several of the sensors 72. In each sensor, the bus optical fiber is flexed and has a fiber tap-off port 74 across a gap 76 from a terminal end 78 of an optical fiber 80 in a target area. The optical fiber is mounted for movement with a cantilevered beam member 82. A viscous damping elastomer or fluid 84 fills a housing 86 surrounding the beam and fiber tap-off ports to damp movement of the beam member.

Figure 4:
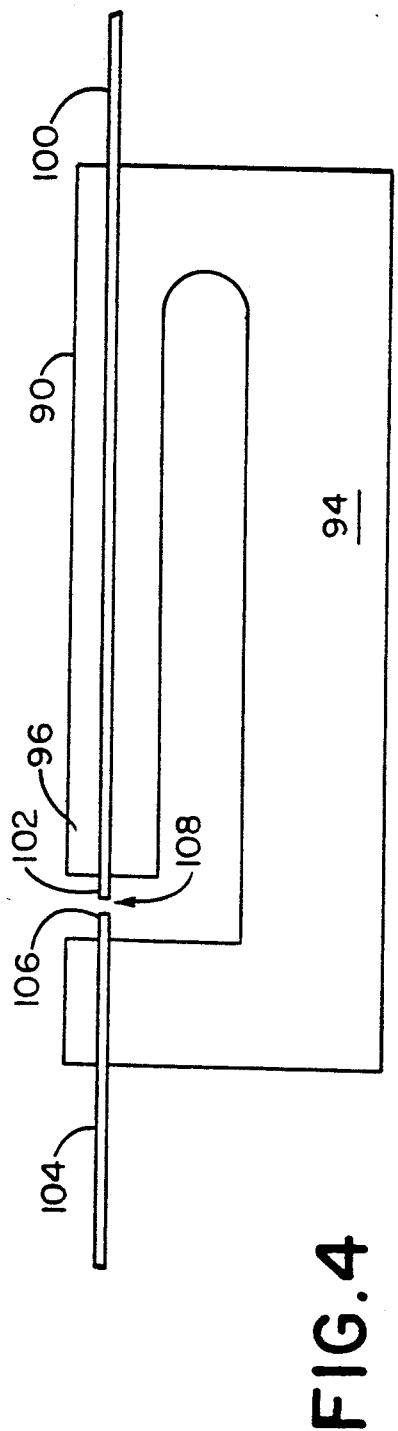
FIG. 4 is yet another alternate embodiment of the sensor of FIG. 1.

With reference to FIG. 4, the sensor includes a beam member 90 formed as an integral part of base 94. A first optical fiber 100 extends along the beam member and terminates at a terminal end 102 adjacent to a free end 96 of the beam member. A second optical fiber 104 has a terminal end 106 positioned in a target area directly across a gap 108 from the terminal end 102 of the first optical fiber. The second optical fiber is mounted to the base 94.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. A sensor comprising:
   a beam member which is cantilevered from a fixed mounting point to a free end, the beam member being configured to flex under selected acceleration to cause the beam free end to move;
   an optical fiber extending along a longitudinal length of and supported by the beam member and terminating adjacent the beam free end, the optical fiber being small in cross-section relative to the beam member;
   a target means fixedly mounted across an air gap from the optical fiber terminal end, such than an amount of light transmitted between the optical fiber terminal end and the target means changes with sensed acceleration.

2. The sensor as set forth in claim 1 wherein the target means includes a terminal end of a second fiber, the first and second optical fiber terminal ends being mounted contiguous such than an amount of light transmitted therebetween changes with increased acceleration.

3. The sensor as set forth in claim 1 wherein the beam member has an enlarged portion adjacent the free end thereof.

4. The sensor as set forth in claim 1 wherein the target means includes a mirror for reflecting light emitted from the optical fiber terminal end.

5. The sensor as set forth in claim 1 further including an optically coupling elastomer disposed in the gap between the optical fiber terminal end and the target means.

6. The sensor as set forth in claim 5 wherein the elastomer further encases the beam member to damp vibration thereof.

7. A system for sensing acceleration, the sensor system comprising:
   a beam member which is cantilevered from a fixed mounting point extending longitudinally to a free end, such that the beam member flexes under acceleration causing the beam free end to move;
   an optical fiber attached to and extending longitudinally along the beam member from the fixed mounting point to the beam member free end, the optical fiber terminating adjacent the beam free end, the beam member having a transverse cross section that is larger than a transverse cross section of the optical fiber;
   a target means fixedly mounted across an air gap from the optical fiber terminal end, such that an amount of light transmitted between the optical fiber terminal end and the target means changes with sensed acceleration.

8. The system as set forth in claim 7 wherein the target means is a terminal end of a second fiber, the first and second optical fiber terminal ends being mounted contiguous such that an amount of light transmitted therebetween changes with increased acceleration.

9. The system as set forth in claim 7 wherein the beam member has an enlarged portion adjacent the free end thereof.

10. The system as set forth in claim 7 wherein the target means includes a mirror for reflecting light emitted from the optical fiber terminal end back to the optical fiber terminal end.

11. The sensor as set forth in claim 7 further including an optically transmissive elastomer disposed in the gap between the optical fiber terminal end and the target means.

12. The sensor as set forth in claim 7 further including viscous fluid encasing the beam member for damping vibration thereof.

13. The system as set forth in claim 7 wherein the target means includes a bus optical fiber having a takeoff port disposed generally across the gap from the optical fiber terminal end.

14. A sensor comprising:
   an optical fiber for conveying light from a source of illumination to a terminal end thereof;
   a target means for receiving light from the optical fiber terminal end, a gap being defined between the optical fiber terminal end and the target means;
   a cantilevered beam member that is mounted adjacent one end and has a free end adjacent to the gap, the beam member flexing in response to acceleration causing the free end to move such that in response to acceleration, the optical fiber being attached to the beam member such that flexing of the beam member changes alignment of the optical fiber terminal end relative to the target means changing light transmission across the gap from the optical fiber terminal end to the target means.

15. An acceleration sensing system comprising:
   an illumination source;
   an optical fiber for conveying light from the illumination source to a light emission point;
   a target means mounted adjacent the light emission point and defining a gap therebetween;
   a second optical fiber for conveying light from the target means to an opto-electronic transducer means for providing an electrical output signal in accordance with an intensity of light received from the second optical fiber;
   a cantilever member having a free end that moves in response to sensed acceleration, the cantilever member having a substantially constant transverse cross-section which is larger than a transverse cross section of the optical fiber, the optical fiber being a separate structure from the cantilever member and attached longitudinally along the cantilever member.

* * * * *